United States Patent
Narayanan et al.

(10) Patent No.: US 8,185,311 B2
(45) Date of Patent: May 22, 2012

(54) MULTIUSER OILFIELD DOMAIN ANALYSIS AND DATA MANAGEMENT

(75) Inventors: Arun Kumar Narayanan, Houston, TX (US); Lisa Miriah Ashcroft, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 560 days.

(21) Appl. No.: 12/404,880

(22) Filed: Mar. 16, 2009

(65) Prior Publication Data

US 2009/0265110 A1    Oct. 22, 2009

Related U.S. Application Data

(60) Provisional application No. 61/047,053, filed on Apr. 22, 2008.

(51) Int. Cl.
G06F 19/00    (2011.01)
(52) U.S. Cl. .......................................................... 702/6
(58) Field of Classification Search ................ 702/6, 13, 702/14, 182–185, 188
See application file for complete search history.

(56) References Cited

U.S. PATENT DOCUMENTS

| | | | |
|---|---|---|---|
| 5,992,519 A | 11/1999 | Ramakrishnan et al. | |
| 6,313,837 B1 | 11/2001 | Assa et al. | |
| 6,980,940 B1 | 12/2005 | Gurpinar et al. | |
| 7,248,259 B2 | 7/2007 | Fremming et al. | |
| 7,894,991 B2 * | 2/2011 | Del Castillo et al. | 702/9 |
| 2003/0216897 A1 | 11/2003 | Endres et al. | |
| 2004/0220846 A1 | 11/2004 | Cullick et al. | |
| 2005/0149307 A1 | 7/2005 | Gurpinar et al. | |
| 2006/0197759 A1 | 9/2006 | Fremming | |
| 2007/0112547 A1 | 5/2007 | Ghorayeb et al. | |
| 2010/0088082 A1 | 4/2010 | Ingham et al. | |

FOREIGN PATENT DOCUMENTS

| | | |
|---|---|---|
| WO | 9964896 | 12/1999 |
| WO | 2004049216 | 6/2004 |
| WO | 2009/032416 A1 | 3/2009 |

OTHER PUBLICATIONS

GB Search Report dated Sep. 15, 2010.
Roxar Launches IRAP RMS Uncertainty Management, Stavanger, Norway, Nov. 27, 2006, 3 pages.
Schlumberger, Petrel, Enhance Precision Geosteering and Decision Making with Real-Time 3D Modeling Using Petrel Workflow Tools, May 2005, 2 pages.

(Continued)

*Primary Examiner* — Edward Raymond
(74) *Attorney, Agent, or Firm* — Colin L. Wier

(57) ABSTRACT

A method of oilfield data management including collecting oilfield data from an oilfield, executing instructions on a processor to perform a domain analysis of the oilfield data by a first analysis team to generate a first analysis, the first analysis team comprising a plurality of users who analyze a portion of the oilfield data relating to one or more oilfield functions, selectively providing access to the first analysis and the portion of the oilfield data for the plurality of users based on a continued analysis of the oilfield, executing instructions on the processor to perform the domain analysis of the oilfield data by a second analysis team to generate a second analysis, the second analysis team analyzing the portion of the oilfield data relating to the one or more oilfield functions, and selectively synchronizing the first analysis and the second analysis to generate a synchronized result.

18 Claims, 10 Drawing Sheets

OTHER PUBLICATIONS

Flagship Geoscience, L.L.C., Stragmagic as a Reservoir Characterization Tool, A Case Study in the Caddo & Vineyard Formations—Central Texas, Sep. 1998, 9 pages.

Paradigm, Paradigm Announces Geolog Version 6.6, Press Release, Amsterdam, Netherlands, Jun. 20, 2005, 2 pages.

VoxelGeo, Volume-Based Seismic Interpretation, 2005, 6 pages.

GeoGraphix, Aries System, 2006, 4 pages.

Bechtold, B., Discovery on OpenWorks Software Enables Direct Access to Existing OpenWorks Projects Using Windows-Based Tools, Feb. 2006, 4 pages.

Halliburton, "Dynamic Asset Modeling", Top Technology Solutions 2006, 2 pages.

\* cited by examiner

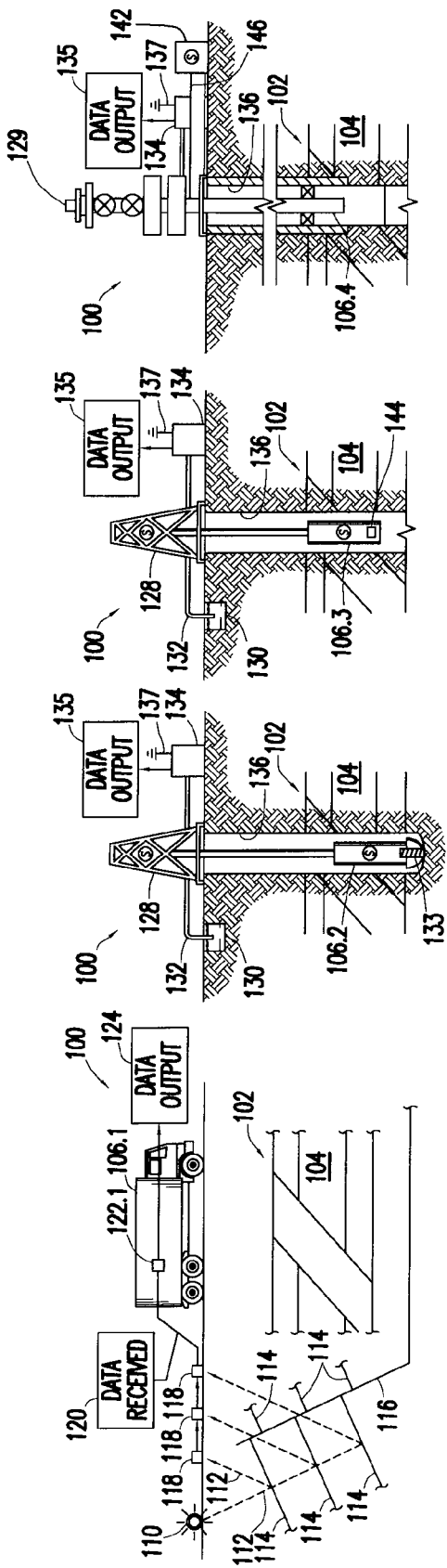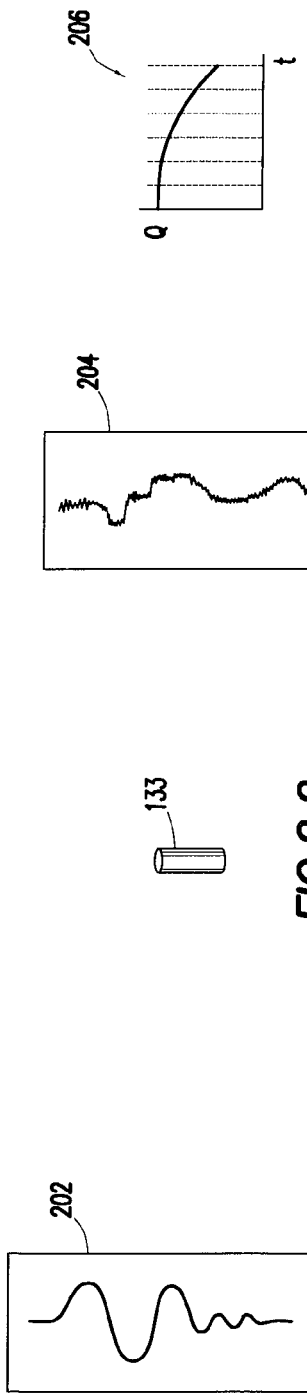

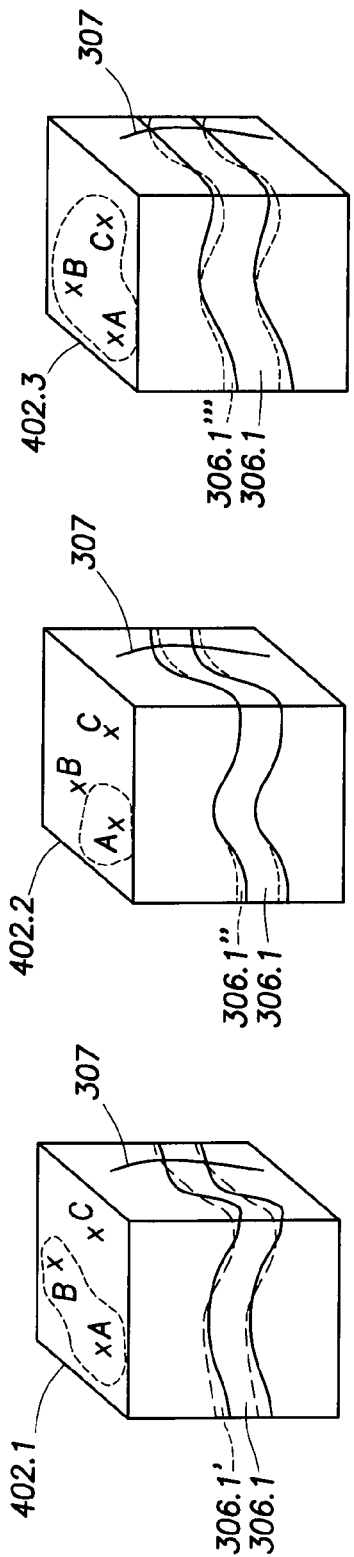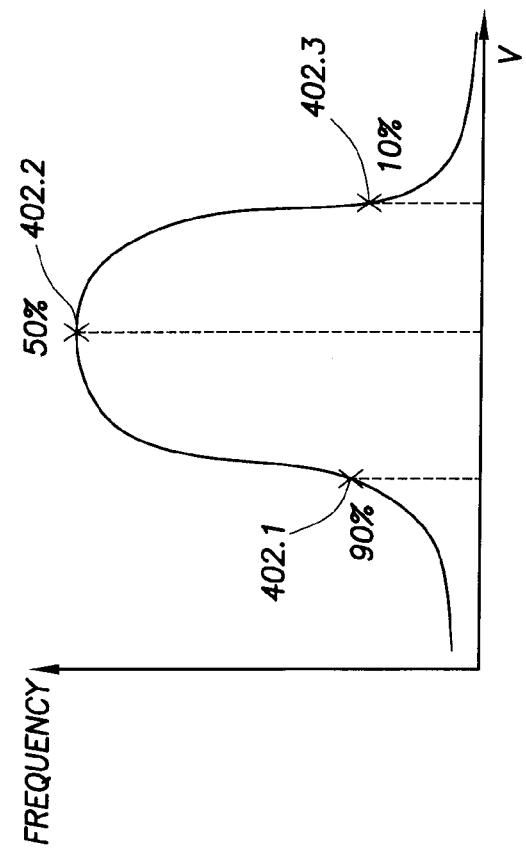
FIG.4.3  FIG.4.2  FIG.4.1  FIG.5

MULTIUSER OILFIELD DOMAIN ANALYSIS AND DATA MANAGEMENT

CROSS REFERENCE TO RELATED APPLICATIONS

This application claims priority under 35 U.S.C. §119(e) from Provisional Patent Application No. 61/047,053 filed Apr. 22, 2008, entitled "Method and System for Data Management," which is hereby incorporated by reference in its entirety.

BACKGROUND

Oilfield operations, such as surveying, drilling, wireline testing, completions, production, planning and oilfield analysis, are typically performed to locate and gather valuable downhole fluids. During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure, and geological stratigraphy that define the geological structures of the subterranean formation. Dynamic data relates to, for example, fluids flowing through the geologic structures of the subterranean formation over time. Such static and/or dynamic data may be collected to learn more about the formations and the valuable assets contained therein.

Sources used to collect static data may be seismic tools, such as a seismic truck that sends compression waves into the earth. Signals from these waves are processed and interpreted to characterize changes in the anisotropic and/or elastic properties, such as velocity and density, of the geological formation at various depths. This information may be used to generate basic structural maps of the subterranean formation. Other static measurements may be gathered using downhole measurements, such as core sampling and well logging techniques. Core samples may be used to take physical specimens of the formation at various depths. Well logging involves deployment of a downhole tool into the wellbore to collect various downhole measurements, such as density, resistivity, etc., at various depths. Such well logging may be performed using, for example, a drilling tool and/or a wireline tool. Once the well is formed and completed, fluid flows to the surface using production tubing and other completion equipment. As fluid passes to the surface, various dynamic measurements, such as fluid flow rates, pressure, and composition may be monitored. These parameters may be used to determine various characteristics of the subterranean formation.

Sensors may be positioned about an oilfield to collect data relating to various oilfield operations. For example, sensors in the drilling equipment may monitor drilling conditions, sensors in the wellbore may monitor fluid composition, sensors located along the flow path may monitor flow rates, and sensors at the processing facility may monitor fluids collected. Other sensors may be provided to monitor downhole, surface, equipment or other conditions. Such conditions may relate to the type of equipment at the wellsite, the operating setup, formation parameters, or other variables of the oilfield. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The data may be used to predict downhole conditions, and make decisions concerning oilfield operations. Such decisions may involve well planning, well targeting, well completions, operating levels, production rates and other operations and/or operating parameters. Often this information is used to determine when to drill new wells, re-complete existing wells, or alter wellbore production. Oilfield conditions, such as geological, geophysical and reservoir engineering characteristics may have an impact on oilfield operations, such as risk analysis, economic valuation, and mechanical considerations for the production of subsurface reservoirs.

Data from one or more wellbores may be analyzed to plan or predict various outcomes at a given wellbore. In some cases, the data from neighboring wellbores or wellbores with similar conditions or equipment may be used to predict how a well will perform. Usually, a large number of variables and large quantities of data may be used to consider in analyzing oilfield operations. It is, therefore, often useful to model the behavior of the oilfield operation to determine the desired course of action. During the ongoing operations, the operating parameters may be adjusted as oilfield conditions change and new information is received.

SUMMARY

In general, in one aspect, multiuser oilfield domain analysis and data management relates to a method of oilfield data management including collecting oilfield data from an oilfield, executing instructions on a processor to perform a domain analysis of the oilfield data by a first analysis team to generate a first analysis, the first analysis team comprising a plurality of users who analyze a portion of the oilfield data relating to one or more oilfield functions, selectively providing access to the first analysis and the portion of the oilfield data for the plurality of users based on a continued analysis of the oilfield, executing instructions on the processor to perform the domain analysis of the oilfield data by a second analysis team to generate a second analysis, the second analysis team analyzing the portion of the oilfield data relating to the one or more oilfield functions, and selectively synchronizing the first analysis and the second analysis to generate a synchronized result.

Other aspects of oilfield data management will be apparent from the following description and the appended claims.

BRIEF DESCRIPTION OF THE DRAWINGS

So that the above-described features of oilfield data management can be understood, a more particular description of oilfield data management, briefly summarized above, may be had by reference to the embodiments thereof that are illustrated in the appended drawings. It is to be noted, however, that the appended drawings illustrate typical embodiments of oilfield data management and are therefore not to be considered limiting of its scope, for oilfield data management may admit to other equally effective embodiments.

FIGS. 1.1-1.4 show a schematic view of an oilfield having subterranean structures containing reservoirs therein, various oilfield operations being performed on the oilfield.

FIGS. 2.1-2.4 show graphical depictions of data collected by the tools of FIGS. 1.1-1.4, respectively.

FIGS. 4.1-4.3 are schematic, 3D views of the static models based on the data acquired by the data acquisition tools of FIG. 3.

FIG. 5 shows a graphical representation of a probability plot of static models of FIG. 4.

DETAILED DESCRIPTION

Figure 3:
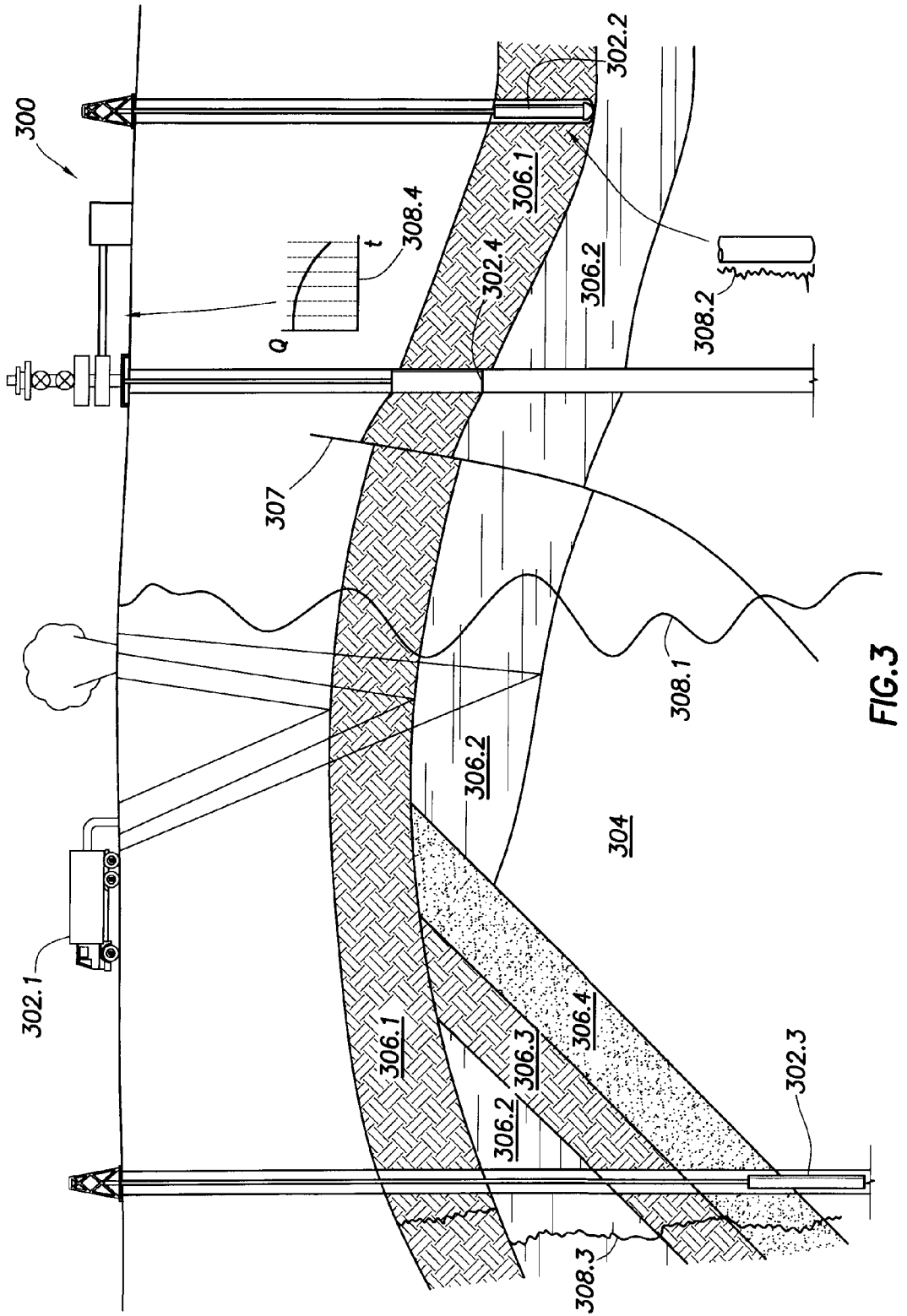
FIG. 3 is a schematic view, partially in cross section of an oilfield having a plurality of data acquisition tools positioned at various locations along the oilfield for collecting data from the subterranean formations.

Multiuser oilfield domain analysis and data management are shown in the above-identified figures and described in detail below. In the description, like or identical reference numerals are used to identify common or similar elements. The figures are not necessarily to scale and certain features and certain views of the figures may be shown exaggerated in scale or in schematic in the interest of clarity and conciseness.

FIG. 1.1 depicts a survey operation being performed to generate a seismic data output record (124) using recording truck computer (122.1) on a seismic recording truck (106.1) to receive, via geophone-receivers (118), data (120) of sound vibration(s) (112) that reflect off horizons (114) in an earth formation (116) from an acoustic source (110).

FIG. 1.2 depicts a drilling operation being performed by a drilling tool (106.2) suspended by a rig (128) and advanced into the subterranean formation (102) to form a wellbore (136) for reaching the reservoir (104). Drilling mud is circulated through the drilling tool (106.2) via a flow line (132) back to a mud pit (130) on the surface. The drilling tool may be adapted for measuring downhole properties such as adapted for taking a core sample (133). A surface unit (134) with a transceiver (137) collects data output (135) generated during the drilling operation and allows communications between various portions of the oilfield (100) or other locations.

FIG. 1.3 depicts a wireline operation and includes all the elements depicted in FIG. 1.2 except that the drilling tool (106.2) is substituted by a wireline tool (106.3) adapted for performing well logs, downhole tests, collecting samples, and/or performing a seismic survey operation based on an explosive or acoustic energy source (144) in which case the wireline tool (106.3) may provide data output (135) to the surface unit (134).

FIG. 1.4 depicts a production operation being performed by a production tool (106.4) deployed from a production unit or Christmas tree (129) and into the completed wellbore (136) of FIG. 1.3 for drawing fluid from the downhole reservoirs (104) into surface facilities (142) via a gathering network (146). Sensors (S) positioned about the oilfield (100) are operatively connected to a surface unit (134) with a transceiver (137) for collecting data (135), for example, reservoir data, wellbore data, surface data and/or process data.

While one wellsite is shown, it will be appreciated that the oilfield (100) may cover a portion of land that hosts one or more wellsites. Part, or all, of the oilfield may be on land and/or sea. Also, the oilfield operations depicted in FIGS. 1.1-1.4 may be performed with any combination of one or more oilfields, one or more processing facilities and one or more wellsites.

FIGS. 2.1-2.4 are graphical depictions of data collected by the tools of FIGS. 1.1-1.4, respectively. FIG. 2.1 depicts a seismic trace (202) of the subterranean formation (102) of FIG. 1.1 taken by survey tool (106.1). FIG. 2.2 depicts a core sample (133) taken by the logging tool (106.2) of FIG. 1.2. FIG. 2.3 depicts a well log (204) of the subterranean formation (102) taken by the wireline tool (106.3) of FIG. 1.3. FIG. 2.4 depicts a production decline curve (206) of fluid flowing through the subterranean formation (102) taken by the production tool (106.4) of FIG. 1.4.

FIG. 3 is a schematic view, partially in cross section of an oilfield (300) having data acquisition tools (302.1), (302.2), (302.3), and (302.4) positioned at various locations along the oilfield (300) for collecting data of a subterranean formation (304). The data acquisition tools (302.1-302.4) may be the same as data acquisition tools (106.1-106.4) of FIGS. 1.1-1.4, respectively, or others not depicted. As shown, the data acquisition tools (302.1-302.4) generate data plots or measurements (308.1-308.4), respectively. These data plots are depicted along the oilfield (300) to demonstrate the data generated by various operations.

Data plots (308.1-308.3) are examples of static data plots that may be generated by the data acquisition tools (302.1-302.4), respectively. Static data plot (308.1) is a seismic two-way response time and may be the same as the seismic trace (202) of FIG. 2.1. Static plot (308.2) is core sample data measured from a core sample of the formation (304), similar to the core sample (133) of FIG. 2.2. Static data plot (308.3) is a logging trace, similar to the well log (204) of FIG. 2.3. Production decline curve or graph (308.4) is a dynamic data plot of the fluid flow rate over time, similar to the graph (206) of FIG. 2.4. Other data may also be collected, such as historical data, user inputs, economic information, and/or other measurement data and other parameters of interest.

The subterranean formation (304) has a plurality of geological formations (306.1-306.4). As shown, the structure has several formations or layers, including a shale layer (306.1), a carbonate layer (306.2), a shale layer (306.3), and a sand layer (306.4). A fault line (307) extends through the layers (306.1, 306.2). The static data acquisition tools may be adapted to take measurements and detect the characteristics of the formations.

While a specific subterranean formation (304) with specific geological structures is depicted, it will be appreciated that the oilfield (300) may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield (300), it will be appreciated that one or more types of measurement may be taken at one or more location across one or more oilfields or other locations for comparison and/or analysis.

The data collected from various sources, such as the data acquisition tools of FIG. 3, may then be processed and/or evaluated. Typically, seismic data displayed in the static data plot (308.1) from the data acquisition tool (302.1) is used by a geophysicist to determine characteristics of the subterranean formations (304) and features. Core data shown in static plot (308.2) and/or log data from the well log (308.3) is typically used by a geologist to determine various characteristics of the subterranean formation (304). Production data from the graph (308.4) is typically used by the reservoir engineer to determine fluid flow reservoir characteristics. The data analyzed by the geologist, geophysicist and the reservoir engineer may be analyzed using modeling techniques.

FIGS. 4.1-4.3 depict three-dimensional graphical representations of the subsurface referred to as a static model. The static model may be generated based on one or more of the models generated from, for example, the data gathered using acquisition tools (302.1-302.4). In the figures provided, the static models (402.1-402.3) are generated by the data acquisition tools (302.1-302.3) of FIG. 3, respectively. These static models may provide a bi-dimensional view of the subterranean formation, based on the data collected at the given location.

The static models may have different accuracies based on the types of measurements available, quality of data, location, and other factors. While the static models of FIGS. 4.1-4.3 are taken using certain data acquisition tools at a single location of the oilfield, one or more of the same or different data acquisition tools may be used to take measurements at one or more locations throughout the oilfield to generate a variety of models. Various analysis and modeling techniques may be selected depending on the desired data type and/or location.

Each of the static models (402.1-402.3) is depicted as volumetric representations of an oilfield with one or more reservoirs, and their surrounding formation structures. These volumetric representations are a prediction of the geological structure of the subterranean formation at the specified location based upon available measurements. The representations are probable scenarios, created using the same input data (historical and/or real time), but having differing interpretation, interpolation, and modeling techniques. As shown, the models contain geological layers within the subterranean formation. In particular, fault (307) of FIG. 3 extends through each of the models. Each static model also has reference points A, B and C located at specific positions along each of the static models. These static models and the specific reference points of the static models may be analyzed. For example, a comparison of the different static models may show differences in the structure of fault (307) and the adjacent layer. Each of the reference points may assist in the comparison between the various static models. Adjustments may be made to the models based on an analysis of the various static models in FIGS. 4.1-4.3, and an adjusted formation layer may be generated as will be described further below FIG. 5 is graphical representation of a probability plot of multiple static models, such as the models (402.1-402.3) of FIGS. 4.1-4.3. The graph depicts a range of reservoir attribute value (V), such as volumetrics, production rate, gross rock thickness, net pay, cumulative production, etc. The value of the reservoir attribute (V) can vary due to any static or dynamic component(s) being assessed, such as structure, porosity, permeability, fluid contact levels, etc. The variables are typically constrained in the modeling exercise to be within reasonable predictions of what the real reservoir(s) are capable of, or what has been observed in similar reservoirs. This graph is a histogram showing multiple model realizations that may be generated by the provided data. The variable results may be generated by varying multiple model parameters. The graph may then be generated by reviewing and estimating the probability of the models generated and plotting them.

As shown, all the model realizations that make up the distribution graph are equally probable in geological terms. The histogram indicates that static model 402.1 provides a ninety percent probability of having at least that amount of variable (V). The histogram as shown also indicates that static model (402.2) has a fifty percent probability of having at least that amount of variable (V), and static model (402.3) a ten percent probability of having this higher amount. This graph suggests that static model 402.3 is the more optimistic model estimate of variable V. The static models and their associated likelihoods may be used, for example in determining field development plans and surface facility production model. A static model representation (402.1) through (402.3) may be selected based upon a desired risk and/or economic tolerance.

Referring back to the static models of FIGS. 4.1-4.3, the models have been adjusted based on the dynamic data provided in the production of the graph (308.4) of FIG. 3. The dynamic data collected by data acquisition tool (302.4) is applied to each of the static models (402.1-402.3). As shown, the dynamic data indicates that the fault (307) and layer (306.1) as predicted by the static models may be adjusted. The layer (306.1) has been adjusted in each model as shown by the dotted lines. The modified layer is depicted as (306.1'), (306.1") and (306.1''') for the static models of FIGS. 4.1-4.3, respectively.

The dynamic data may indicate that certain static models provide a better representation of the oilfield. A static model's ability to match historical production rate data may be considered a good indication that it may also give accurate predictions of future production. In such cases, an appropriate static model may be selected. In this case, while the static model of FIG. 4.3 may have the highest overall probability of accuracy based solely on the static model as shown in FIG. 5, an analysis of the dynamic model suggests that the model of FIG. 4.2 is a better match. As shown in FIGS. 4.1-4.3, a comparison of layers (306.1) with the modified layers (306.1'), (306.1") and (306.1''') indicates that the fault (307) with associated fluid transmissibility across the fault most closely matches the prediction provided by static model (402.2).

In this example, the selected static model (402.2) is modified based on the dynamic data. The resulting adjusted model has been adjusted to better match the production data. As shown, the position of the geological structure (306.1) has been shifted to (306.1") for the adjusted model to account for the differences shown by the dynamic data. As a result, the static model may be adapted to fit both the static and dynamic models better.

In determining the best overall model, the static and/or dynamic data may be considered. In this case, when considering both the static and dynamic data, the static model (402.2) of FIG. 4.2 is selected as the earth model with the highest probability of accuracy based on both the static probabilities and dynamic input. To obtain the best overall model, it may be desirable to consider the static and dynamic data from multiple sources, locations and/or types of data.

The evaluation of the various static and dynamic data of FIG. 3 involves considerations of static data, such as seismic data (308.1) considered by a geophysicist, geological data (308.2, 308.3) considered by a geologist and production data (308.4) considered by a reservoir engineer. Each individual typically considers data relating to a specific function and provides models based on this specific function. However, as depicted in FIGS. 4.1-4.3, information from each of the separate models may affect the determination of the best overall model. Moreover, information from other models or sources may also affect adjustments to the model and/or selection of the best overall earth model. The earth model generated as described in FIGS. 4.1-5 is a basic earth model determined from an analysis of the various models provided.

Another source of information that may affect the model(s) is economic information. Throughout the oilfield operations depicted in FIGS. 1.1-1.4, there are numerous business considerations. For example, the equipment used in each of these figures has various costs and/or risks associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment, accuracy and sensitivity of the measurement tools, data representations and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation, rate of production, type of equipment, and other factors that will affect the costs and risks associated with the oilfield operation.

Figure 6:
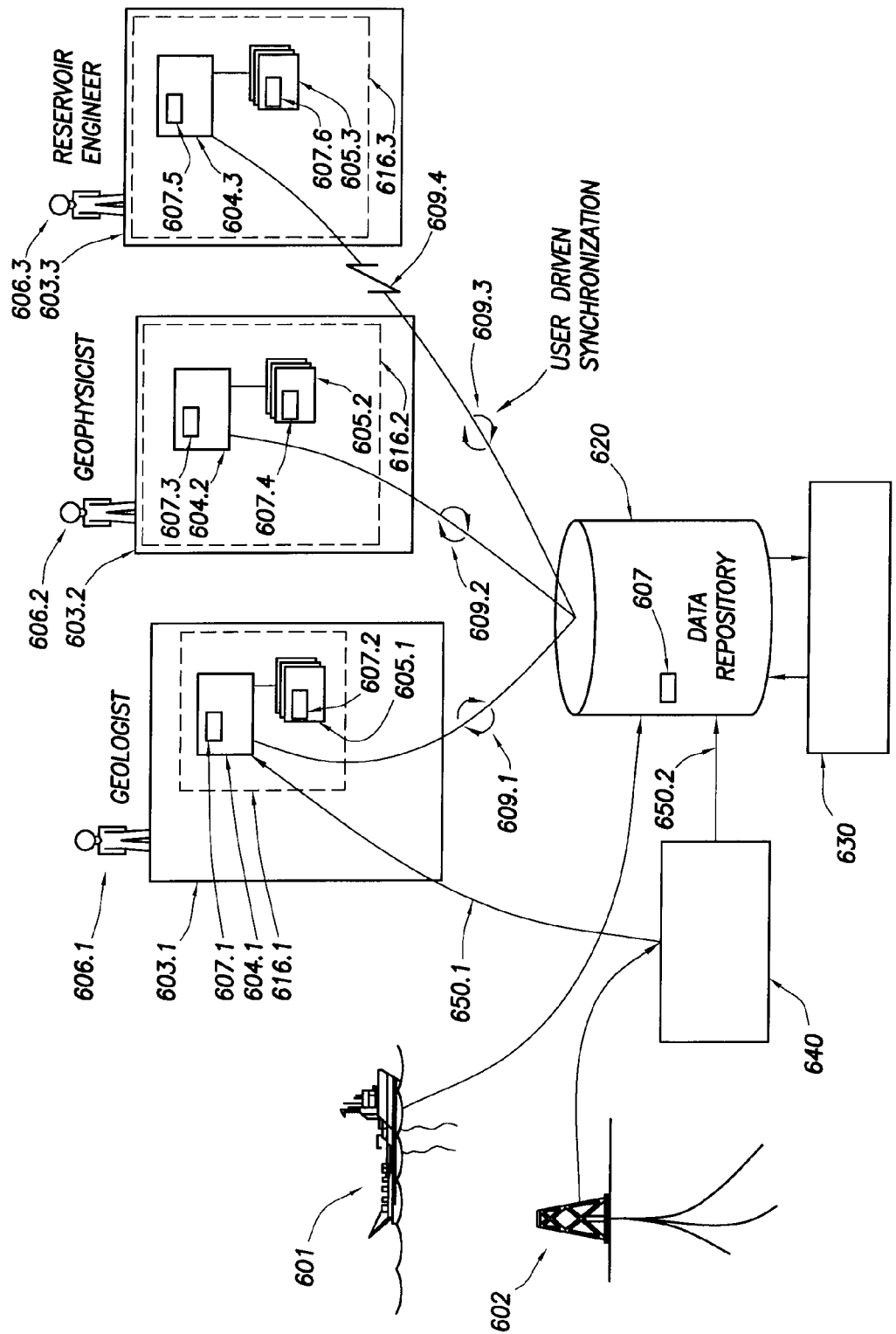
FIG. 6 is a schematic diagram depicting a linked system for domain analysis of the oilfield.

FIG. 6 is a schematic diagram depicting a linked system for domain analysis of the oilfield. Oilfield data is collected from sensors about the oilfield such as seismic data from sensor (601) and a well log from sensor (602). The data sensors (601, 602) may be the same as or similar to the data acquisition tools (302.1-302.4) of FIG. 3 or the data acquisition tools (106.1-106.4) of FIGS. 1.1-1.4. The oilfield data may be the same as or similar to the data plots or measurements (308.1-308.4) of FIG. 3. The oilfield data may be collected into a data management application (640) and provided (650.1) to oilfield analysis workstations, such as the workstation (603.1). The oilfield data may be transported about the oilfield and within the linked system in many forms. For example, the data may be transported using a portable format (e.g., a format that is portable between many different types of systems, platforms, topologies, architectures, etc.) and/or a tier-sized format (e.g., a format that is sized proportionate to a tier or to a selected tier-size).

The oilfield data may also be collected (650.2) into a data repository (620). Further, the data management application (640) may be operatively connected to the data repository (620). At least a portion of the data repository (620) may be configured as a database. The linked system selectively links the various oilfield functions of different users, for example, geologist (606.1), geophysicist (606.2), and reservoir engineer (606.3). The linkage may be implemented in many different ways. In the example shown in FIG. 6, the linkage is established using a shared data repository (620) and user-controlled communication links (hereinafter "links") (609.1), (609.2), and (609.3). The linkage may also be established directly among the various oilfield functions, which will be described later. The links (609.1), (609.2), and (609.3) enable the different users to work with each other in a collaborative fashion. Each of these oilfield functions may perform separate modeling functions as previously described using, for example workstations (603.1), (603.2), and (603.3). As each user produces an improved understanding of the digital model, the user can share that incremental piece with the other members in the team. Any other user can piece together the various interpretations and improve the collective understanding beyond that of an individual user. A copy of the various models, interpretations, and/or analysis associated with a portion of the oilfield data or the portion of the oilfield data relating to the one or more oilfield functions may be fetched from the data repository (620) and/or database.

Continuing with FIG. 6, the links (609.1), (609.2), and (609.3) are configured to allow incremental sharing with signals regarding which items are more recent than their counterparts. In addition, the links (609.1), (609.2), and (609.3) transfer elements of the digital model with full contextual information. This transfer allow the updates to the digital model in the repository (620) by the various users to be seen by the system as if they were done by all users locally in the database. In other words, it appears to the various users that links do not even exist. The links (609.1), (609.2), and (609.3) provide mechanisms to safeguard the digital model from simultaneous use and from updating elements of the digital model unintentionally with an anachronistic error (i.e., where the second user updates elements that are more recent than that user's updates). Finally, the links (609.1), (609.2), and (609.3) embody control and flagging mechanisms that allow for full lifecycle management. In particular, it is possible to detect the elements of the digital model that are new, with low confidence, and distinguish them from those that are mature, with high confidence. Controls within the links (609.1, 609.2, 609.3) and the data repository (620) can ensure that controls associated with the lifecycle of data can be implemented by the team members. In one or more embodiments, the data repository (620) may reside in a separate machine (not shown) from the workstations (603.1), (603.2), or (603.3).

As shown in FIG. 6, the workstations (603.1), (603.2), and (603.3) are configured with modeling or simulation software (604.1), (604.2), and (604.3) and comprise data repositories (605.1), (605.2), and (605.3), respectively. Furthermore, the digital models (616.1), (616.2), and (616.3) are configured in the workstations (603.1), (603.2) and (603.3) using the modeling or simulation software (604.1), (604.2) and (604.3) and the data repositories (605.1), (605.2) and (605.3), respectively. The digital models (616.1), (616.2) and (616.3) may be the same as or similar to the models (402.1-402.3) of FIG. 4. The data repositories (605.1), (605.2), and (605.3) may store or otherwise manage oilfield data collected from sensors (601) and/or (602). The data repositories (605.1), (605.2) and (605.3) may also store or otherwise manage outputs of the digital models (616.1), (616.2) and (616.3), for example oilfield analysis generated from the modeling or simulation software (604.1), (604.2) and (604.3) by the users (606.1), (606.2) and (606.3). In general, the data repositories (605.1), (605.2), (605.3), and (620) may include different data structures such as a flat file, a data base, and/or any other data structures suitable for storing or otherwise managing oilfield data and analysis. For example, the data repositories (605.1), (605.2), and (605.3) may comprise flat files, and the data repository (620) may comprise a database. In other examples, the data repositories (605.1), (605.2), and (605.3) may each comprise different data structures.

The oilfield data collected from sensors (601) and/or (602) may then be evaluated using the digital models (616.1), (616.2), and/or (616.3). Typically, seismic data is used by the geophysicist (606.2) to determine characteristics of the subterranean formation. Core data is typically used by a geologist (606.1) to determine various characteristics of the geological structures of the subterranean formation. Production data is typically used by the reservoir engineer (606.3) to determine fluid flow reservoir characteristics. The subterranean formation, the associated geological structures, the reservoir itself, the wellsite, the wellbore, the surface network, the production facility, etc. are all examples of oilfield objects that are analyzed by the digital models (616.1), (616.2) and/or (616.3). Each of these oilfield objects may be modeled as one or more instances (i.e., a collection of related information), such as instances (607.1), (607.2), (607.3), (607.4), (607.5) and (607.6), within each of these digital models (616.1), (616.2), and (616.3). Furthermore, one or more instances of the oilfield object may be created in the shared data repository (620). Each of these instances of the oilfield object may include collected oilfield data or generated oilfield analysis. For example, the instance (607) may be created when initial oilfield data are collected (650.2) from sensors (601) and/or (602). In this case, a user (e.g., the geologist (606.1)) may retrieve the oilfield data associated with the instance (607) using the link (609.1) for creating the instance (607.1) within the digital model (616.1). The instance (607.1) may then be simulated using the modeling or simulation software (604.1) and optionally saved in the data repository (605.1) as another instance (607.2). In another example, the instance (607.1) may be created when initial oilfield data are collected (650.1) from sensors (e.g., (601) and/or (602)). The instance (607.1) may also be simulated using the modeling or simulation software (604.1) and optionally saved in the data repository (605.1) as another instance (607.2). In this case, the instance (607) may be created from the instances (607.1) or (607.2) under user (e.g., the geologist (606.1)) control. In either of these cases, different instances of the oilfield object may be revised independently based on simulation results. These independently revised instances may then be selectively synchronized (i.e., updated to the same revision). For example, the instances (607.1) and (607.2) may be synchronized within the digital model (616.1) based on functionalities built in the modeling or simulation software (604.1). In another example, the instances (607.2) and (607) may be selectively synchronized using the link (609.1), when it is activated, or the data management application (640).

As described above, the oilfield data and/or analysis associated with the instances (607.1), (607.2), and (607) may be saved in different data structures. The oilfield data and/or analysis may be converted from one data structure to another data structure during the creation or the synchronization of the instances. The conversion functionality may be implemented in many different ways. The functionality may be embedded within the link (609.1), the data repository (620), the modeling or simulation software (604.1), data management application (640), or combinations thereof.

In an example, a dynamic model (616.3) from the reservoir engineer (606.3) may provide insights to the geologist (606.1) and geophysicist (606.2) for the models (616.1) and (616.2) that they generate. Similarly, the output of either the geologist (606.1) or the geophysicist (606.2) may provide insights to other oilfield functions. The linking of the separate oilfield functions provides an exchange of results and consideration of a wider variety of data. Such an exchange of information may be from one model to another directly (e.g., among the models (616.1), (616.2) and (616.3) and discussed in more detail later) or through a shared data repository (e.g., the data repository (620) as shown in FIG. 6). The geologist (606.1), geophysicist (606.2), and/or reservoir engineer (606.3) may choose to alter their models based on the models provided by the other oilfield functions.

As shown in FIG. 6, the digital models (616.1), (616.2) and/or (61.6.3) may be selectively coupled to the data repository (620) using user-controlled communication links (609.1), (609.2), and/or (609.3) such that the models and/or their outputs are provided to other oilfield functions based on the shared access to the data repository (620). For example, the instance (607) may be created when initial oilfield data are collected (650.2) from sensors (601) and/or (602). In this case, each of the geologist (606.1), the geophysicist (606.1) and the reservoir engineer (606.3) may retrieve the oilfield data associated with the instance (607) using the links (609.1), (609.2) and (609.3) for creating the instances (607.1), (607.3) and (607.5) within the digital models (616.1), (616.2) and (616.3), respectively. The instances (607.1), (607.3) and (607.5) may then be simulated using the modeling or simulation software (604.1), (604.2) and (604.3) and optionally saved in a corresponding data repository (605.1), (605.2) or (605.3), respectively as instances (607.2), (607.4) and (607.6). In another example, the instance (607.1) may be created when initial oilfield data are collected (650.1) from sensors (601) and/or (602). The instance (607.1) may also be simulated using the modeling or simulation software (604.1) and optionally saved in the data repository (605.1) as another instance (607.2). In this case, the instance (607) may be created from the instances (607.1) or (607.2) under user (e.g., the geologist (606.1)) control.

Each of the geophysicist (606.1) and the reservoir engineer (606.3) may then retrieve the oilfield data associated with the instance (607) using the links (609.2) and (609.3) to create the instances (607.3) and (607.5) within the digital models (616.2) and (616.3), respectively. The instances (607.3) and (607.5) may then be simulated using the modeling or simulation software (604.2) and (604.3) and optionally saved in the data repository (605.2) and (605.3), respectively as instances (607.4) and (607.6). In either of these two cases, different instances of the oilfield object within each digital model may be revised independently based on the results of the modeling or simulation software (604.1), (604.2), and (604.3). Change notifications may be sent to users of the linked system when each of these revisions is made within each simulation model. These independently revised instances may then be selectively synchronized among different simulation models through the instance (607) in the shared data repository (620) using the links (609.1), (609.2) and (609.3).

The links (609.1), (609.2), and/or (609.3) may be activated automatically or by a user selectively to couple the digital models (616.1), (616.2) and/or (616.3) to the data repository (620). For example, the connection (609.4) may be broken to de-activate the link (609.3) such that the workstation (603.3) may go offline from the data repository (620), in which case the simulation model (616.3) may operate in a stand-alone configuration without being coupled to the data repository (620). At a later time, the connection (609.4) may be established or re-established to activate the link (609.3) such that the workstation (603.3) may be online with the data repository (620) in which case the simulation model (616.3) may operate in a coupled configuration with the data repository (620). The connection (609.4) may be broken and/or established/re-established under user control or based on a triggered event. The connection (609.4) may be combined with the link (609.3) or be a portion of the link (609.3).

As shown in FIG. 6, multiple instances of an oilfield object may be stored or otherwise managed in multiple data structures for sharing among different oilfield functions. In one example, an instance of an oilfield may be created for the simulation model as a clone (or an alternate version) from an instance in the shared date repository (620) in which case the cloned instance will not be synchronized to the instance in the shared date repository (620). In another example, an instance of an oilfield may be created for the simulation model as a copy of an instance in the shared date repository (620) in which case the copied instance will be synchronized to the instance in the shared date repository (620). The ability to create an alternate version is an innate feature of the links (609.1), (609.2), and (609.3). A user may work independently or from a remote location using workstation in stand-alone offline configuration. A user may also work in a sharing mode using a workstation in online-coupled configuration. The links (609.1), (609.2), and (609.3) are flexible and adjust according to the connectivity present in the environment.

Accordingly, multiple users may work together on an oilfield object with synchronized instances across their simulation models.

The selective synchronization allows multiple users to revise instances of the oilfield object simultaneously within their own simulation models by configuring the synchronization in a user control mode. The selective synchronization also allows multiple users to exchange information such as outputs from their simulation models to generate domain analysis of the oilfield by activating the links and updating the instance in the shared data repository (620) with revisions from instances in the simulation models. The domain analysis of the oilfield may also be generated in conjunction with other analysis tools such as the analysis tool (630) and/or the data management application (640).

Figure 7:
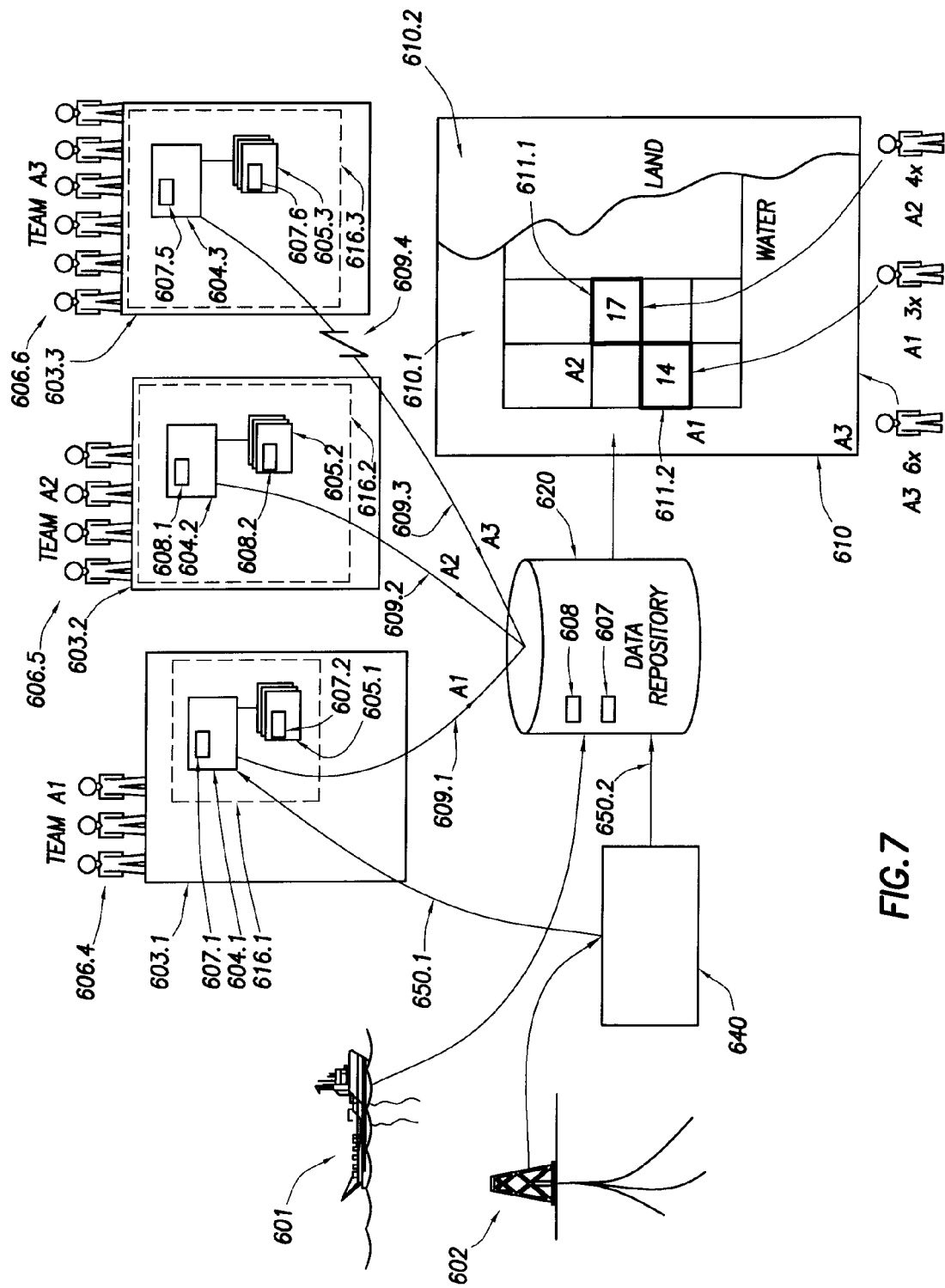
FIG. 7 is a schematic diagram depicting a linked system for domain analysis of the oilfield among multiple project teams.

FIG. 7 is a schematic diagram depicting a linked system for domain analysis of the oilfield among multiple project or analysis teams. Here, the sensors (601) and (602), the data management application (640), the data repository (620), the oilfield workstations (603.1), (603.2) and (603.3), the simulation models (616.1), (616.2) and (616.3), the simulation and/or modeling software (604.1), (604.2) and (604.3), the data repositories (605.1), (605.2) and (605.3), the links (609.1), (609.2) and (609.3), and the connection (609.4) are substantially the same as shown in FIG. 6 above. As depicted in FIG. 7, the workstations (603.1), (603.2) and (603.3) are used by project teams A1 (606.4), A2 (606.5) and A3 (606.6), respectively. Each of the workstations (603.1), (603.2), and (603.3) represents one of a collection of workstations assigned to the corresponding analysis team. Each team may include multi-function operators such as the geologist, the geophysicist, and the reservoir engineer working in a domain analysis mode, using the collection of workstations assigned to each team, as depicted in FIG. 6 above.

Each team may be assigned a geographical area of interest in a subterranean formation. These areas of interests may or may not overlap with each other. A portion (610) of the data repository (620) is shown in an expanded view representing the subterranean formation. The portion (610) further includes a portion (610.1) representing subterranean geological structures under water and a portion (610.2) representing subterranean geological structures on land. The portion (610.1) is further divided into multiple portions including the non-overlapping portions (611.1) and (611.2). For example, the project team A3 (606.6) may be working on the entire portion (610) to perform a general exploratory survey for defining a development plan for the corresponding general geographical region. The project team A2 (606.5) may be working on the portion (611.1) corresponding to a geographical region in a drilling phase. The project team A1 (606.4) may be working on the portion (611.2) corresponding to a geographical region in a production phase. The project team A1 (606.4) and project team A2 (606.5) may share modeling outputs based on spatial proximity and geophysical correlation of the oilfield objects in their respective assigned area of interests (611.2) and (611.1). The project team A3 (606.6) may share modeling outputs from the project teams A1 (606.4) and A2 (606.5) where the area of interests (611.2) and (611.1) overlap with the geologic structure area of interest (610.1).

Due to the different nature of the exploratory phase, the drilling phase, and the production phase which the project teams are focused on, the various instances (607)/(607.1)/(607.2), (608)/(608.1)/(608.2), and (607.5)/(607.6), although associated with the same or similar oilfield objects, may include oilfield data and/or analysis at different levels of abstraction with varying degrees of detail. These various instances may also be stored or otherwise managed in different data structures. The association (or pairing) among these various instances may be rule based and can be customized by adjusting the rules. Specific one-on-one pairing among the various instances may also be assigned.

The links (609.1), (609.2), and (609.3) have the capability to distinguish between the objects that belong to the various teams. The associated (or paired) instances may be selectively synchronized as described in FIG. 6 above. For example, a cloned instance used for modeling in an offline configuration may be specifically paired with the original instance it is cloned from upon switching to modeling in an online configuration to allow for the cloned instance to be selectively synchronized with the original instance. The oilfield data and/or analysis may be converted from one data structure to another data structure as well as from one level of abstraction to a different level of abstraction during the creation or the synchronization of the instances. The conversion functionality may be implemented in a variety of manners. Specifically, the conversion functionality may be embedded within the links (609.1), (609.2), and (609.3), the data repository (620), the simulation and/or modeling software (604.1), (604.2), and (604.3), or suitable combinations thereof. Further, the simulation and/or modeling software (604.1), (604.2), and (604.3) may also include the functionality of geophysical software in accordance with one or more embodiments of oilfield data management.

Figure 8:
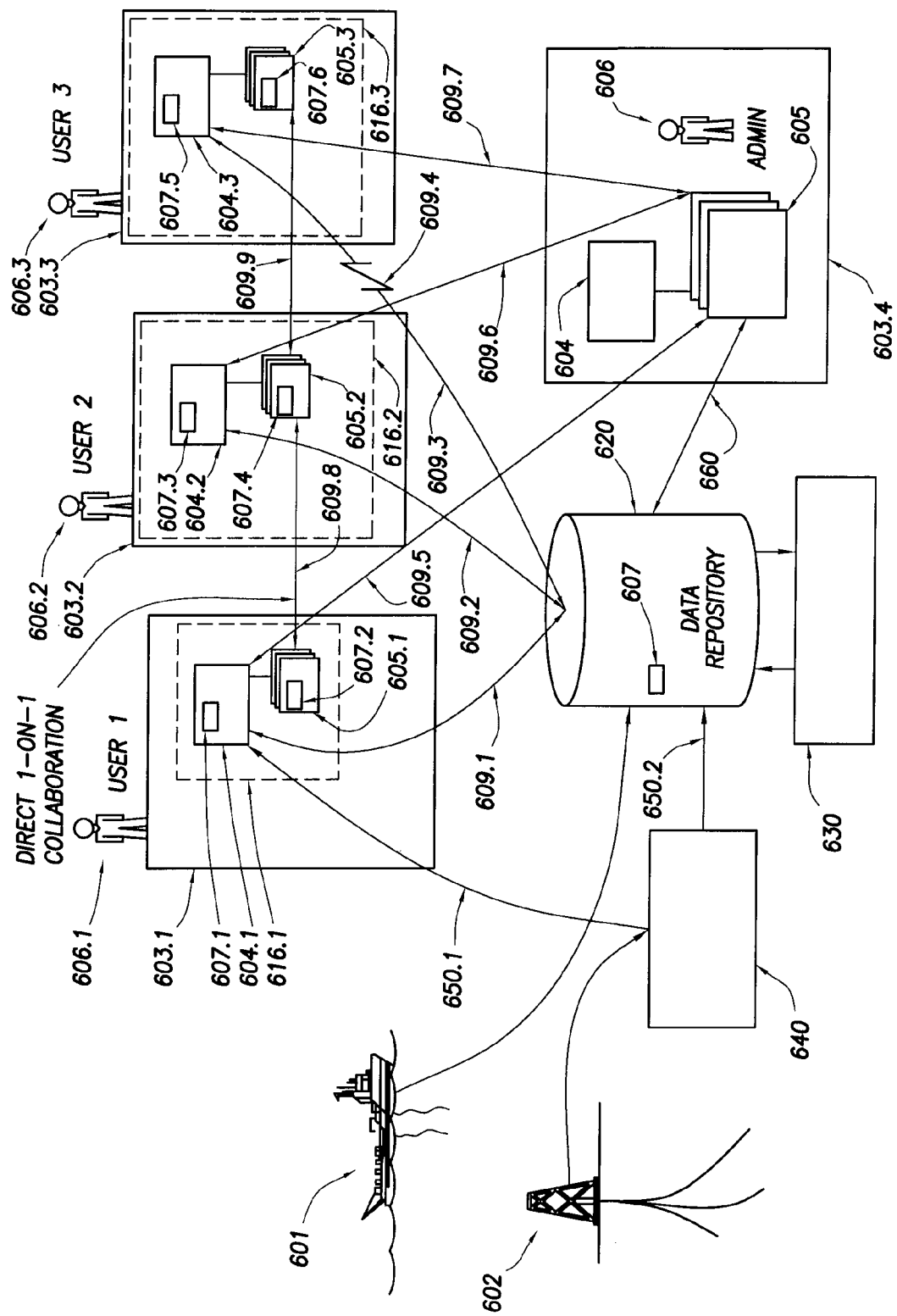
FIGS. 8, 9, and 10 are schematic diagrams depicting linked systems for domain analysis of the oilfield in various configurations.
Figure 9:
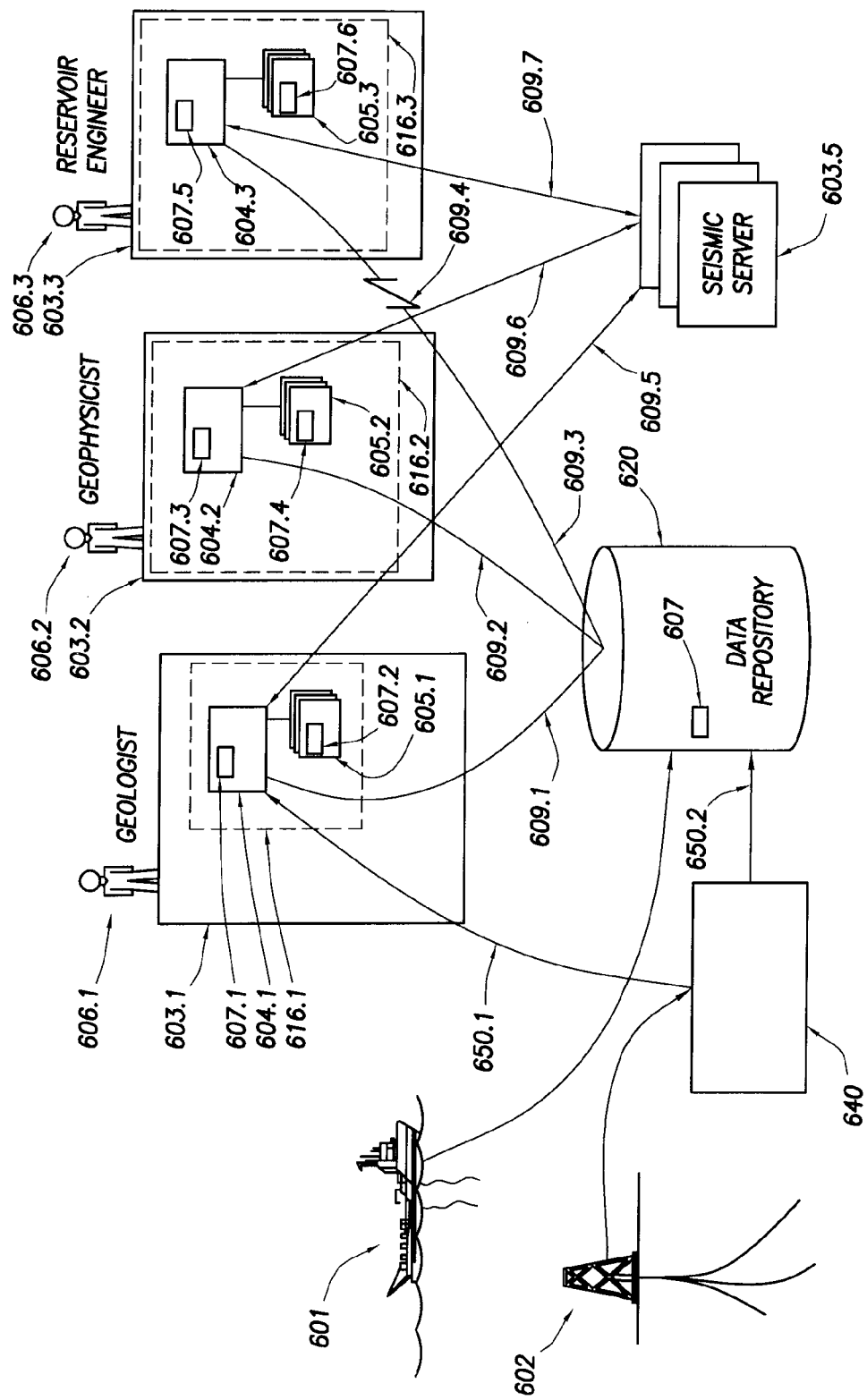
Figure 10:
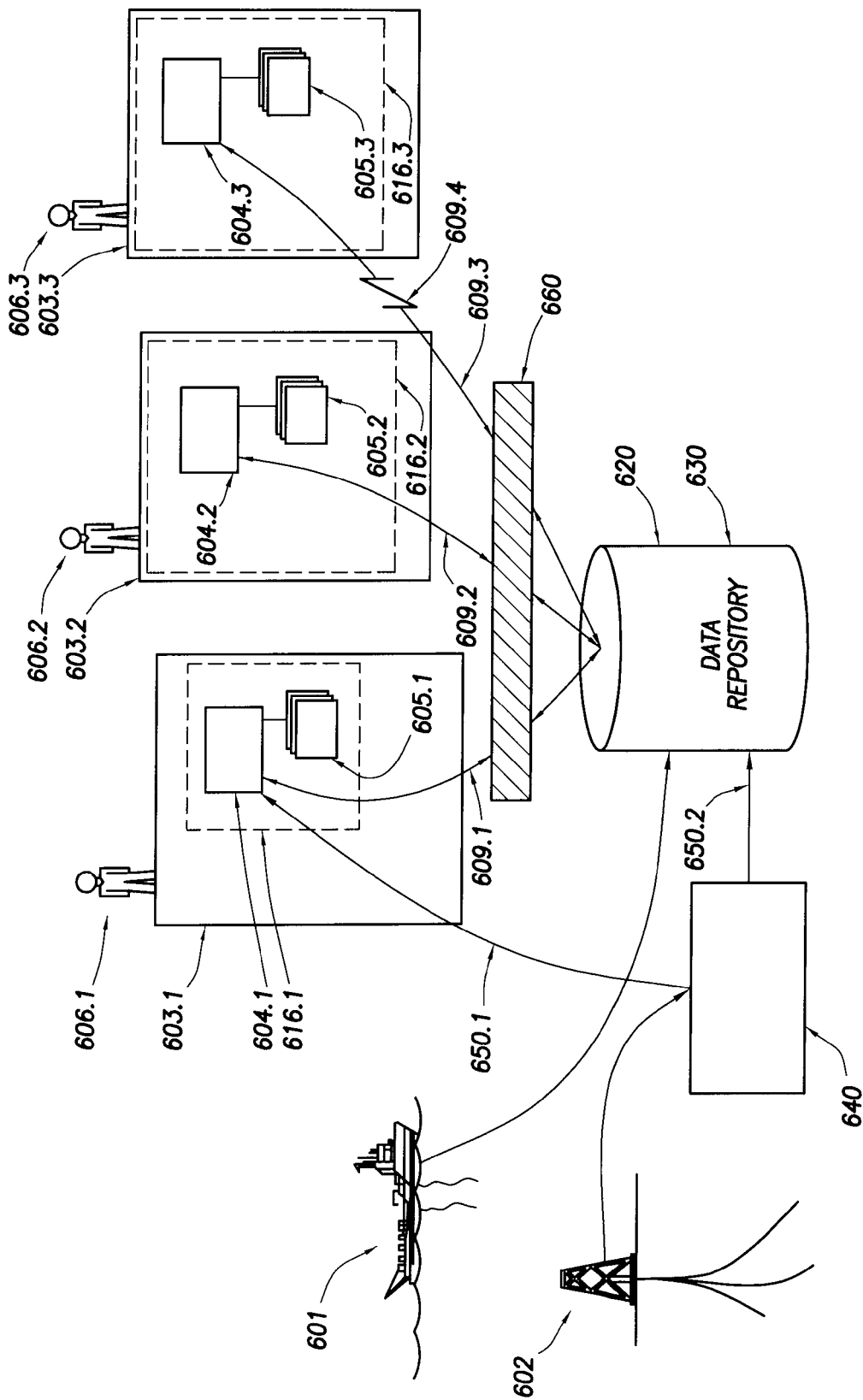

FIGS. 8, 9, and 10 are schematic diagrams depicting linked systems for domain analysis of the oilfield in various configurations. In FIGS. 8, 9, and 10, the sensors (601) and (602), the data management application (640), the data repository (620), the users (606.1), (606.2) and (606.3), the oilfield workstations (603.1), (603.2) and (603.3), the simulation models (616.1), (616.2) and (616.3), the simulation software (604.1), (604.2) and (604.3), the data repositories (605.1), (605.2) and (605.3), the links (609.1), (609.2) and (609.3), and the connection (609.4) are substantially the same as shown in FIG. 6 above. Further, the users (606.1), (606.2), and (606.3) may share the modeling outputs to generate domain analysis of the oilfield based on the shared data repository (620) as described in FIG. 6 above.

FIG. 8 depicts a linked system for domain analysis based on a shared data repository (620) as well as a shared project (603.4) (which may contain data with reference values) and/or other direct links (609.8) and (609.9). In addition to the depiction in FIG. 6, the simulation models (616.1), (616.2), and (616.3) are optionally coupled to a reference project (603.4) using links (609.5), (609.6), and (609.7). The simulation models (616.1), (616.2), and (616.3) are also optionally coupled using direct links (609.8) and (609.9). The instances (607.1)-(607.6) are associated with oilfield objects and are created/synchronized with conversion functionality using the shared data repository (620) in a similar manner as described in FIG. 6 above. Furthermore, these various instances (607.1)-(607.6) of oilfield objects may be further synchronized in a selective manner based on user control or event driven triggering using the direct links (609.8) and (609.9) to access simulation models of different users. This synchronization may be performed by a process coordinator, which selectively synchronizes various analyses. The direct links (609.8) and (609.9) allow external access from outside of the workstation where the simulation model resides. In a similar manner, an image of each simulation models of different users may be kept in the reference project (603.4). The reference project (603.4) may include the reference simulation software (604) and the reference data repository (605). Images of the various instances (607.1)-(607.6) may be stored or otherwise managed in the reference data repository (605). Each image may be created as a copy or an alternate version to be cleaned up later. Oilfield data associated with each of these instances may also include a quality tag, for example to facilitate the version clean up task. An administrator (606) may monitor the reference data repository (605) and synchronizes the various instances (607.1)-(607.6) in a coordinating role with the users (606.1), (606.2), and (606.3). The synchronized instances in the reference project (603.4) may be promoted (660) to the shared data repository (620). As shown in FIG. 8, selective synchronization of various instances may be performed using any of the shared data repository (620), the direct links (609.8) and (609.9), the reference project (603.4), or any combinations thereof. The links (609.1), (609.2), and (609.3) are fully compatible with other transactions that the user performs in this environment.

FIG. 9 depicts a linked system for domain analysis based on a shared data repository (620) as well as a seismic server (603.5). In addition to the depiction in FIG. 6, the simulation models (616.1), (616.2), and (616.3) are optionally coupled to a seismic server (603.5) using links (609.5), (609.6), and (609.7). The seismic server (603.5) provides expanded workstation resources (e.g., computing resources, memory resources, storage resources, etc.) to the oilfield workstations (603.1), (603.2), and (603.3). The instances (607.1)-(607.6) are associated with oilfield objects and are created/synchronized with conversion functionality using the shared data repository (620) in a similar manner as described in FIG. 6 above. Furthermore, these various instances (607.1)-(607.6) of oilfield objects may be further synchronize to a reference instance (not shown) created in the seismic server (603.5) in a selective manner based on user control or event driven triggering using the links (609.5), (609.6) and (609.7). As shown in FIG. 9, selective synchronization of various instances may be performed using any of the shared data repository (620), the seismic server (603.5), or any combinations thereof.

FIG. 10 depicts a linked system for domain analysis based on a shared data repository (620) as well as an application server (660). Instead of the depiction in FIG. 6, the simulation models (616.1), (616.2), and (616.3) are coupled to the data repository (620) through an application server (660). The application server (660) allows the oilfield workstations (603.1), (603.2), and (603.3) to access the data repository (620) indirectly such that each linked workstation (603.1), (603.2), and (603.3) need not be reconfigured if the data repository (620) is changed, replaced, or otherwise modified. However, the primary characteristics of the links (609.1), (609.2), and (609.3) are unchanged by the reconfiguration to include an application server (660).

Figure 11:
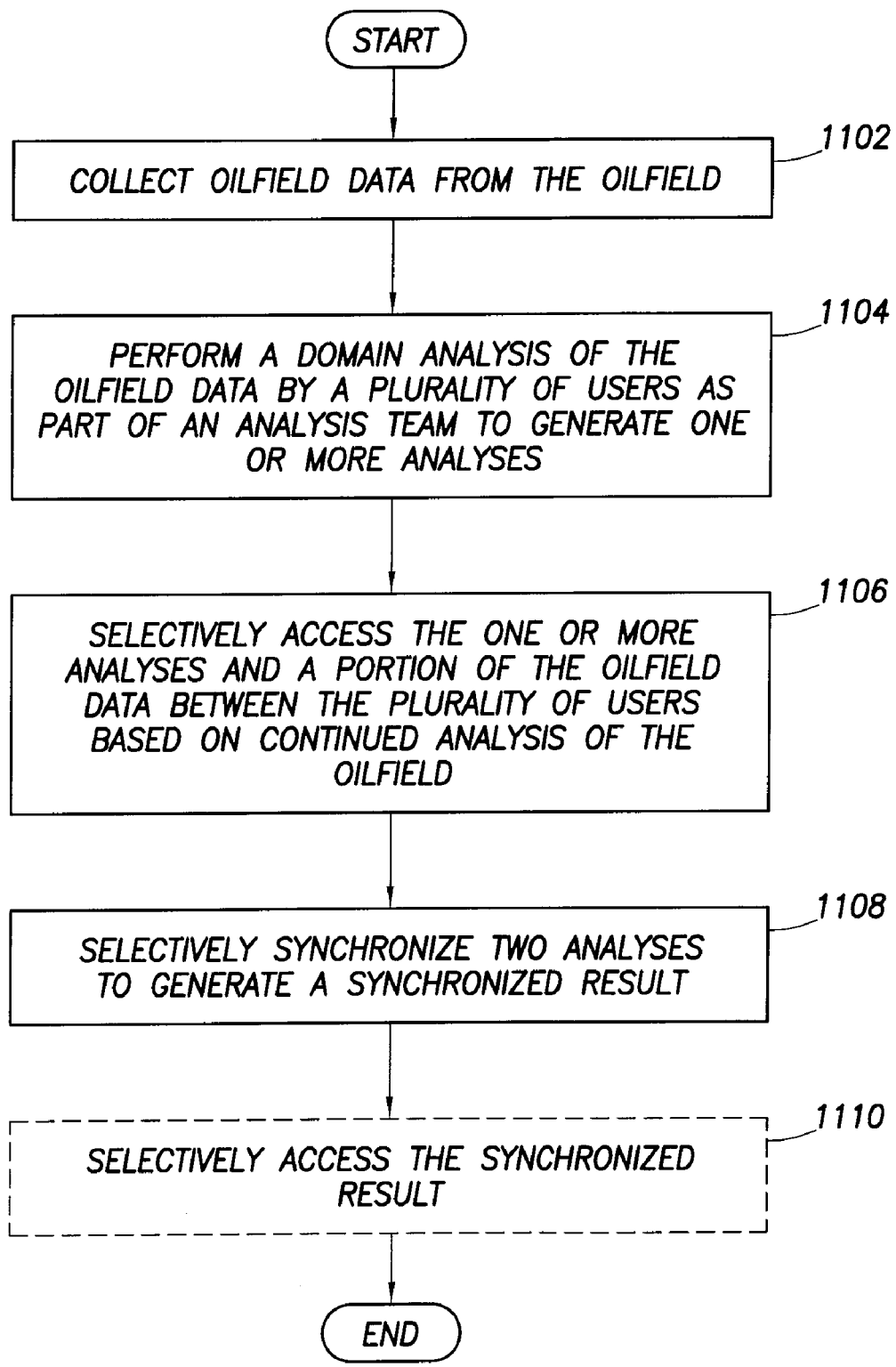
FIG. 11 is a flowchart depicting a method for domain analysis of the oilfield.

FIG. 11 is a flowchart depicting a method for domain analysis of the oilfield. Initially, oilfield data is collected from sensors about the oilfield (Element 1102). The oilfield data may be seismic data and/or well log such as the data plots or measurements (308.1-308.4) of FIG. 3. Next, a domain analysis of the oilfield data is performed by numerous users as part of an analysis team to generate one or more analysis (Element 1104). During the domain analysis, at least one of users on the analysis team analyzes a portion of the oilfield data relating to one or more oilfield functions. The oilfield function(s) may include geology, geophysics, reservoir engineering, and/or other oilfield functions. The portion of the oilfield data may be seismic data typically used by a geophysicist to determine characteristics of the subterranean formation, core data typically used by a geologist to determine various characteristics of the geological structures of the subterranean formation, production data typically used by the reservoir engineer to determine fluid flow reservoir characteristics, and/or other oilfield data. The analysis may be used to analyze oilfield objects and may be configured using simulation software and data repositories used by users such as the geologist, the geophysicist, the reservoir engineer, or other oilfield users on their corresponding systems (e.g., oilfield workstations). The oilfield objects may include the subterranean formation, the associated geological structures, the reservoir itself, the wellsite, the wellbore, the surface network, the production facility, etc. Instances of oilfield objects may be created within the simulation software or associated data repositories for the modeling operation. The instance(s) of oilfield objects may include oilfield data collected from sensors or oilfield analysis generated by the simulation software.

Once the one or more analysis is generated, the analysis and a portion of the oilfield data may be selectively accessed between the plurality of users based on a continued analysis of the oilfield (Element 1106). Depending on the implementation, the analysis may be selectively synchronized to generate a synchronized result (Element 1108). The selective synchronization may be automatic or based on activation by a user based on the analysis. The selective synchronization may be performed by synchronizing a number of analyses and/or oilfield instances to a reference project, a shared data repository, a seismic server, direct link among the models, or any combinations thereof. The reference project, the shared data repository, and the seismic server may reside on a system separate from the oilfield workstations. Instances of oilfield objects may be created in the shared data repository as clones or copies of the instances within the simulation models for synchronization purposes. These various instances may have different levels of abstraction and may be stored or otherwise managed in different data structures. Functionality to convert these various instances during creation or synchronization may be embedded in the simulation software, the data repository, the links coupling the simulation models and the shared data repository, or any combinations thereof. At this stage, the synchronized result of the domain analysis performed by the geologist, the geophysicist, the reservoir engineer, or other oilfield users may be selectively accessed (Element 1110).

The elements or all of the process may be repeated as desired. Repeated elements may be selectively performed until satisfactory results achieved. For example, elements may be repeated after adjustments are performed. For example, this may be done to update the simulation models and/or to determine the impact of any modifications.

The data input, coupling, layout, and constraints defined in the simulation provide flexibility to the simulation process. These components of the various simulators are selected to satisfy the requirements of the oilfield operation. Any combination of simulators may be selectively linked to create the overall oilfield simulation. The process of linking the simulators may be re-arranged and simulations may be repeated using different configurations. Depending on the type of coupling and/or the arrangement of simulators, the appropriate oilfield simulation may be selected to provide the desired results. Various combinations of simulators may be attempted and compared to determine the best outcome. Adjustments to the oilfield simulation may be made based on the oilfield, the simulators, the arrangement, and/or other factors.

Figure 12:
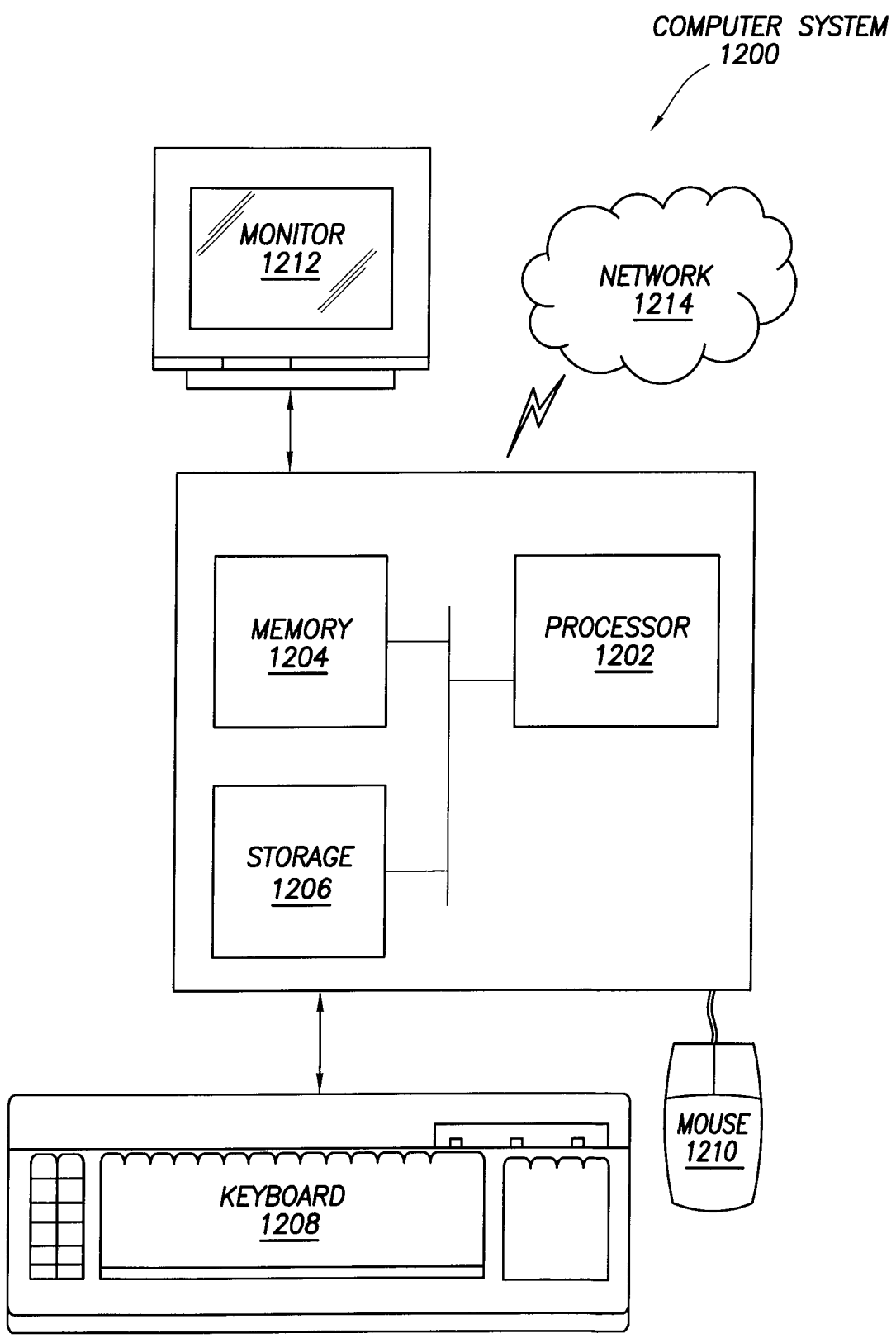
FIG. 12 shows an example computer system into which implementations of various techniques described herein may be implemented in accordance with one or more embodiments.

Embodiments of oilfield data management may be implemented on virtually any type of computer regardless of the platform being used. For example, as shown in FIG. 12, a computer system (1200) includes one or more processor(s) (1202), associated memory (1204) (e.g., random access memory (RAM), cache memory, flash memory, etc.), a storage device (1206) (e.g., a hard disk, an optical drive such as a compact disk drive or digital video disk (DVD) drive, a flash memory stick, etc.), and numerous other elements and functionalities typical of today's computers (not shown). The computer (1200) may also include input means, such as a keyboard (1208), a mouse (1210), or a microphone (not shown). Further, the computer (1200) may include output means, such as a monitor (1212) (e.g., a liquid crystal display (LCD), a plasma display, or cathode ray tube (CRT) monitor). In particular, the various domain analyses described with respect to FIGS. 5-11 may be performed by executing instructions on the one or more processor(s) (1202) while the analysis results and oilfield data may be stored in the storage device (1206) and displayed on the monitor (1212). The computer system (1200) may be connected to a network (1214) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (1200) includes at least the minimal processing, input, and/or output means necessary to practice embodiments of the disclosed invention.

Further, those skilled in the art will appreciate that one or more elements of the aforementioned computer system (1200) may be located at a remote location and connected to the other elements over a network. Further, embodiments of oilfield data management may be implemented on a distributed system having a plurality of nodes, where each portion of oilfield data management may be located on a different node within the distributed system. In one embodiment, the node corresponds to a computer system. Alternatively, the node may correspond to a processor with associated physical memory. The node may alternatively correspond to a processor with shared memory and/or resources. Further, software instructions for performing embodiments of oilfield data management may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing other subsurface operations, such as mining, water retrieval and acquisition of other underground materials. Further, the portions of the systems and methods may be implemented as software, hardware, firmware, or combinations thereof.

It will be understood from the foregoing description that various modifications and changes may be made in the embodiments of oilfield data management without departing from its true spirit. For example, the selective synchronization may be performed using different combinations of configurations and compared to determine the best outcome, the oilfield user or project team may perform shared oilfield analysis with one or more other users or project teams as desired, the simulation software may provide oilfield functionalities (e.g., seismic interpretation, automated structural interpretation, seismic rendering, domain conversion, seismic sampling, seismic volume rendering and extraction, seismic multi-trace attribute, synthetic seismograms, well correlation, facies modeling, petrophysical modeling, fault analysis, advanced gridding and upscaling of geological models, history match analysis, drilling visualization, well path design, risk assessment, real-time data link), or any combinations thereof.

This description is intended for purposes of illustration and should not be construed in a limiting sense. The scope of oilfield data management should be determined by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of oilfield data management, comprising:
collecting oilfield data from an oilfield;
generating a global instance, based on the oilfield data, to represent an oilfield object, wherein the global instance is stored in a global data structure of a central repository;
executing instructions on a first processor of a first workstation to perform a domain analysis of the oilfield data by a first analysis team to generate a first local instance to represent the oilfield object focusing on a first oilfield function,
wherein the first analysis team comprises a plurality of users who analyze the oilfield data relating to the first oilfield function, and
wherein the first local instance is stored in the first workstation and comprises a first level of abstraction;
executing instructions on a second processor of a second workstation to perform the domain analysis of the oilfield data by a second analysis team to generate a second local instance to represent the oilfield object focusing on a second oilfield function,
wherein the second analysis team analyzes the oilfield data relating to the second oilfield function, and
wherein the second local instance is stored in the second workstation and comprises a second level of abstraction; and
selectively synchronizing, a first link and a second link coupling the first workstation and the second workstation, respectively to the central repository, the global instance, the first local instance, and the second local instance to generate a synchronized result,
wherein the synchronizing comprises:
updating, by the first link and in response to the first analysis team updating the first local instance, the global instance by converting a first data item in the first local instance from the first level of abstraction to the global data structure, and
updating, by the second link and in response to updating the global instance, the second local instance by abstracting the first data item in the global data structure according to the second level of abstraction.

2. The method of claim 1, wherein the synchronizing is performed by a process coordinator.

3. The method of claim 1, further comprising:
selectively passing the oilfield data between the plurality of users and the central repository.

4. The method of claim 1,
wherein the first and second oilfield functions comprise at least one selected from a group consisting of a geological function, a geophysical function, and a reservoir engineering function, and
wherein at least one of the plurality of users comprises at least one selected from a group consisting of a geologist, a geophysicist, and a reservoir engineer.

5. The method of claim 1, further comprising:
cloning at least one selected from a group consisting of the first local instance, the second local instance, and the global instance.

6. The method of claim 1, wherein the domain analysis is performed offline.

7. The method of claim 3, wherein selectively passing the oilfield data comprises transporting the oilfield data in a portable format.

8. The method of claim 3, wherein selectively passing the oilfield data comprises transporting oilfield data in a size-tiered format.

9. A computer readable medium, embodying instructions executable by a computer for oilfield data management, the instructions comprising functionality to:
collect oilfield data from an oilfield;
generate a global instance, based on the oilfield data, to represent an oilfield object, wherein the global instance is stored in a global data structure of a central repository;
perform, on a first processor of a first workstation, a domain analysis of the oilfield data by a first analysis team to generate a first local instance to represent the oilfield object focusing on a first oilfield function,
wherein the first analysis team comprises a plurality of users who analyze the oilfield data relating to the first oilfield function, and
wherein the first local instance is stored in the first workstation and comprises a first level of abstraction;
perform, on a second processor of a second workstation, the domain analysis of the oilfield data by a second analysis team to generate a second local instance to represent the oilfield object focusing on a second oilfield function,
wherein the second analysis team analyzes the oilfield data relating to the second oilfield function, and
wherein the second local instance is stored in the second workstation and comprises a second level of abstraction; and
selectively synchronize, using a first link and a second link coupling the first workstation and the second workstation, respectively to the central repository, the global instance, the first local instance, and the second local instance to generate a synchronized result,
wherein the synchronizing comprises:
updating, by the first link and in response to the first analysis team updating the first local instance, the global instance by converting a first data item in the first local instance from the first level of abstraction to the global data structure, and
updating, by the second link and in response to updating the global instance, the second local instance by abstracting the first data item in the global data structure according to the second level of abstraction.

10. A system for oilfield data management, comprising:
a plurality of sensors located at an oilfield for collecting oilfield data;
a central data repository configured to store a global instance in a global data structure to represent an oilfield object;
a processor for executing a data management application, operatively connected to the central data repository, configured to generate the global instance based on the oilfield data
a first workstation configured to perform a domain analysis of the oilfield data by a first analysis team to generate the first local instance to represent the oilfield object focusing on a first oilfield function, wherein the first analysis team comprises a plurality of users who analyzes the oilfield data relating to the first oilfield function;
a first user-controlled communication link coupling the first workstation to the central data repository;
a second workstation configured to perform the domain analysis of the oilfield data by a second analysis team to generate a second local instance to represent the oilfield object focusing on a second oilfield function,
wherein the second analysis team analyzes the oilfield data relating to the second oilfield function, and
wherein the second local instance is stored in the second workstation and comprises a second level of abstraction; and
a second user-controlled communication link coupling the second workstation to the central data repository,
wherein the processor executing the data management application is further configured to selectively synchronize, using the first user-controlled communication link and the second user-controlled communication link, the global instance, the first local instance, and the second local instance to generate a synchronized result, and
wherein the synchronizing comprises:
updating, by the first user-controlled communication link and in response to the first analysis team updating the first local instance, the global instance by converting a first data item in the first local instance from the first level of abstraction to the global data structure, and
updating, by the second user-controlled communication link and in response to updating the global instance, the second local instance by abstracting the first data item in the global data structure according to the second level of abstraction.

11. The system of claim 10, wherein the central data repository is further configured to clone at least one of a group consisting of: the first local instance, the second local instance, and the global instance.

12. The system of claim 10, wherein the central data repository is further configured to selectively pass the oilfield data to the plurality of users.

13. The system of claim 10, further comprising:
a seismic server configured to provide expanded workstation resources.

14. The system of claim 10, further comprising:
an application server configured to allow the first workstation to access the central data repository indirectly such that a linked system comprising the first workstation requires no reconfiguration when the central data repository is modified.

15. The system of claim 10, wherein the domain analysis is performed while the first user-controlled communication link is offline.

16. The system of claim 10,
wherein the first and second oilfield functions comprise at least one from the group consisting of a geological function, a geophysical function, and a reservoir engineering function, and
wherein at least one of the plurality of users comprises at least one from the group consisting of a geologist, a geophysicist, and a reservoir engineer.

17. The system of claim 10, wherein the oilfield data is transported in a portable format.

18. The system of claim 10, wherein the oilfield data is transported in a size-tiered format.

* * * * *